United States Patent
Jenkins et al.

(10) Patent No.: US 9,158,722 B1
(45) Date of Patent: Oct. 13, 2015

(54) DATA STORAGE DEVICE TO COMMUNICATE WITH A HOST IN A SATA OR A USB MODE

(75) Inventors: Dean M. Jenkins, La Canada-Flintridge, CA (US); Tegan Campbell, Dana Point, CA (US)

(73) Assignee: Western Digital Technologies, Inc., Irvine, CA (US)

(*) Notice: Subject to any disclaimer, the term of this patent is extended or adjusted under 35 U.S.C. 154(b) by 450 days.

(21) Appl. No.: 13/287,947

(22) Filed: Nov. 2, 2011

(51) Int. Cl.
*G06F 13/12* (2006.01)
*G06F 13/38* (2006.01)

(52) U.S. Cl.
CPC .................................. *G06F 13/385* (2013.01)

(58) Field of Classification Search
None
See application file for complete search history.

(56) References Cited

U.S. PATENT DOCUMENTS

| | | | |
|---|---|---|---|
| 4,972,368 A | 11/1990 | O'Brien et al. | |
| 5,875,293 A | 2/1999 | Bell et al. | |
| 6,018,789 A | 1/2000 | Sokolov et al. | |
| 6,065,095 A | 5/2000 | Sokolov et al. | |
| 6,065,096 A | 5/2000 | Day et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,270,415 B1 | 8/2001 | Church et al. | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |
| 6,337,778 B1 | 1/2002 | Gagne | |
| 6,369,969 B1 | 4/2002 | Christiansen et al. | |

(Continued)

OTHER PUBLICATIONS

SATA-IO, "Serial ATA Revision 3.0 Specification", Jun. 2009, https://www.serialata.org/developers/purchase_spec.asp.

(Continued)

*Primary Examiner* — Henry Tsai
*Assistant Examiner* — Juanito Borromeo (57) ABSTRACT

A data storage device to communicate with a host is disclosed. The data storage device includes a controller to select a SATA mode or a USB mode and a SATA connector coupled to the controller. If the USB mode is selected for communication with the host, a plurality of pins of the SATA connector are utilized to transmit USB signals from the controller to the host.

14 Claims, 4 Drawing Sheets

(56) References Cited

U.S. PATENT DOCUMENTS

| | | |
|---|---|---|
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,775 B1 | 2/2004 | Bassett |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,761,580 B2 | 7/2004 | Chang |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,420 B2 | 1/2005 | Resnick |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,886,057 B2 | 4/2005 | Brewer et al. |
| 6,888,831 B1 | 5/2005 | Hospodor et al. |
| 6,890,188 B1 | 5/2005 | Le |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |

(56) References Cited

U.S. PATENT DOCUMENTS

| | | |
|---|---|---|
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,171,502 B2 | 1/2007 | Jeon et al. |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,219,846 B2 | 5/2007 | Kuo et al. |
| 7,237,054 B1 | 6/2007 | Cain et al. |
| 7,240,161 B1 | 7/2007 | Boyle |
| 7,249,365 B1 | 7/2007 | Price et al. |
| 7,262,961 B2 | 8/2007 | Motoe et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,424,126 B2 | 9/2008 | Sicari et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,632,139 B2 | 12/2009 | Chou et al. |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,685,337 B2 | 3/2010 | Merry, Jr. et al. |
| 7,685,338 B2 | 3/2010 | Merry, Jr. et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,761,647 B2 | 7/2010 | Yang |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |

(56) References Cited

U.S. PATENT DOCUMENTS

| | | |
|---|---|---|
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,406 B2 * | 11/2013 | Lin et al. .............. 710/306 |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2002/0046366 A1 | 4/2002 | Ono |
| 2003/0005188 A1 | 1/2003 | Tehrani et al. |
| 2004/0083324 A1 | 4/2004 | Rabinovitz et al. |
| 2004/0087213 A1 | 5/2004 | Kao |
| 2005/0066203 A1 | 3/2005 | Handa et al. |
| 2005/0172044 A1 | 8/2005 | Chien et al. |
| 2005/0176303 A1 | 8/2005 | Wu |
| 2005/0197017 A1 | 9/2005 | Chou et al. |
| 2005/0235171 A1 | 10/2005 | Igari |
| 2005/0268007 A1 | 12/2005 | Nakabayashi |
| 2006/0174049 A1 | 8/2006 | Lin et al. |
| 2007/0053170 A1 | 3/2007 | Yu |
| 2007/0197100 A1 | 8/2007 | Tsao |
| 2007/0260811 A1 | 11/2007 | Merry, Jr. et al. |
| 2008/0162755 A1 | 7/2008 | Minami |
| 2008/0200072 A1 | 8/2008 | Cheong |
| 2009/0113702 A1 | 5/2009 | Hogg |
| 2010/0109795 A1 * | 5/2010 | Jones et al. .............. 333/101 |
| 2010/0223416 A1 | 9/2010 | Ibarra et al. |
| 2010/0306551 A1 | 12/2010 | Meyer et al. |
| 2011/0226729 A1 | 9/2011 | Hogg |
| 2012/0124266 A1 * | 5/2012 | Kim et al. .............. 710/305 |
| 2012/0159042 A1 | 6/2012 | Lott et al. |
| 2012/0250245 A1 * | 10/2012 | Utz et al. .............. 361/679.37 |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

OTHER PUBLICATIONS

VANTEC, "NexStar SATA 6Gbps to USB 3.0 Adapter", http://www.vantecusa.com/en/product/view_detail/471.

UNITEK, "UNITEK USB 3.0 SATA Adapter (Y-1034)",http://usb.brando.com/unitek-usb-3-0-to-sata-adapter-y-1034-__p01348c042d15.html.

* cited by examiner

SATA (DATA) TO USB PINOUT

| PIN | NAME | FUNCTION | USB SIGNALS |
|---|---|---|---|
| 1 | GND | GROUND | |
| 2 | A+ | TRANSMIT+ | USB 3.0 Tx+ |
| 3 | A- | TRANSMIT- | USB 3.0 Tx- |
| 4 | GND | GROUND | |
| 5 | B- | RECEIVE- | USB 3.0 Rx- |
| 6 | B+ | RECEIVE+ | USB 3.0 Rx+ |
| 7 | GND | GROUND | |

70 — 2
71 — 3
73 — 5
74 — 6

SATA (POWER) TO USB PINOUT

| PIN | SIGNAL | USB SIGNALS |
|---|---|---|
| 1 | +3.3VDC | USB 2.0 D+ |
| 2 | +3.3VDC | USB 2.0 D- |
| 3 | +3.3VDC | USB Vbus |
| 4 | GND | |
| 5 | GND | |
| 6 | GND | |
| 7 | +5VDC | |
| 8 | +5VDC | |
| 9 | +5VDC | |
| 10 | GND | |
| 11 | OPTIONAL | |
| 12 | GND | |
| 13 | +12VDC | |
| 14 | +12VDC | |
| 15 | +12VDC | |

DATA STORAGE DEVICE TO COMMUNICATE WITH A HOST IN A SATA OR A USB MODE

BACKGROUND

Today, computing devices such as personal computers, laptop computers, server computers, personal digital assistants, cell-phones, smart phones, tablets, etc., are routinely used at work, home, and everywhere else and have become ubiquitous. Computing devices advantageously enable the use of application specific software, file sharing, the creation of electronic documents, and electronic communication and commerce through the Internet and other wired and wireless networks. A computing device may often interact with a data storage device.

Data storage devices, such as disk drives and solid state drives, may include a serial advanced technology attachment (SATA) connector or a universal serial bus (USB) connector that interfaces through a link to a host computing device that likewise includes a corresponding SATA or USB connector. Unfortunately, data storage devices are separately manufactured for either a SATA mode implementation or a USB mode implementation for interaction with a host device which significantly increases development costs.

Therefore, there is a need for a data storage device that can communicate with a host device in either a SATA or USB mode.

DETAILED DESCRIPTION

Figure 1:
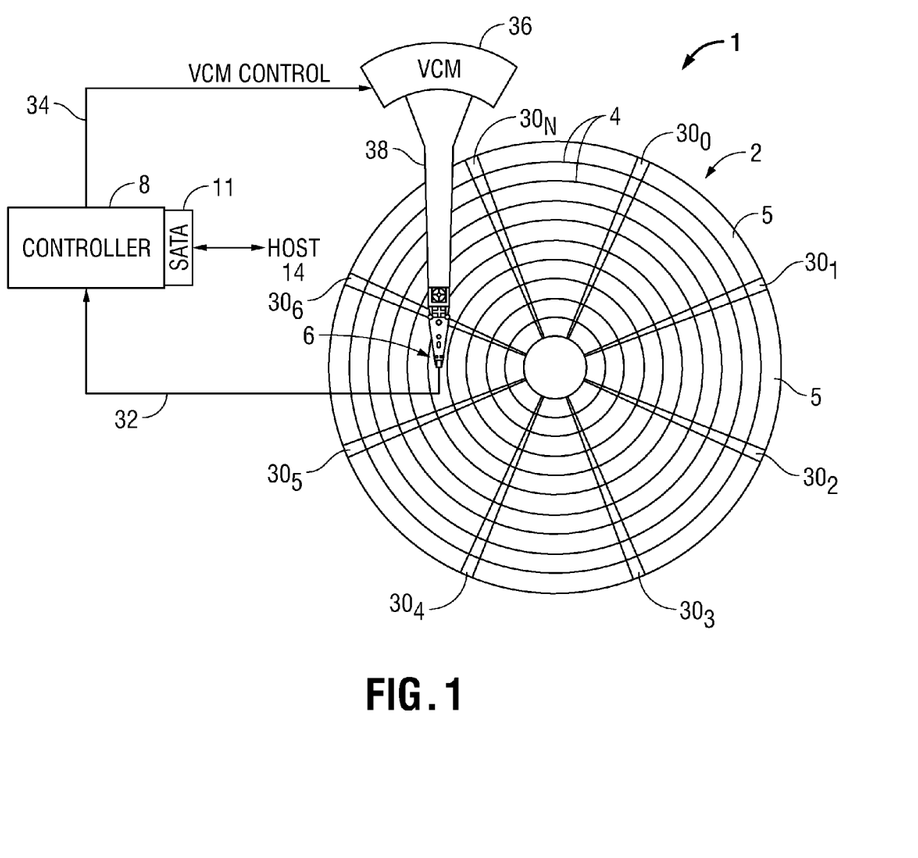
FIG. 1 shows a data storage device in which embodiments of the invention may be practiced.

FIG. 1 shows a data storage device 1 in which embodiments of the invention may be practiced. Storage device 1 may include a controller 8 coupled to a serial advanced technology attachment (SATA) connector 11 that may be used to connect, directly or via an adapter, to a host device 14, such as, a desktop computer, a laptop computer, a server computer, a mobile computing device (e.g., PDA, camera, cell-phone, smart phone, tablet, etc.), or any type of computing device. Controller 8 may be used to select a SATA mode or a universal serial bus (USB) mode for signal communication with the host 14. As will be described, if the USB mode is selected for communication with the host 14, a plurality of pins of the SATA connector 11 are utilized to transmit and receive USB signals to and from host 14.

In one embodiment, storage device 1 may be a disk drive (e.g., a hard disk drive) that includes a disk 2 having a plurality of tracks 4 and a head 6 actuated over the disk 2. The controller 8 may be utilized to select a SATA mode or a USB mode for signal communication with host 14 along with other disk drive operations. Disk 2 may comprise a plurality of embedded servo sectors $30_0$-$30_N$ which define the plurality of tracks 4. Each servo sector $30i$ comprises head positioning information such as a track address for course positioning during seeks and servo bursts for fine positioning while tracking the centerline of a target track during write/read operations. Further, each of the tracks 4 includes data sectors 5 between each of the servo sectors $30i$. The control circuitry 8 processes a read signal 32 emanating from the head 6 to demodulate the servo sectors into a position error signal (PES). The PES is filtered with a suitable compensation filter to generate a control signal 34 applied to a voice coil motor (VCM) 36 which rotates an actuator arm 38 of an actuator assembly about a pivot in a direction that reduces the PES.

The disk drive may employ a sampled servo system in which equally spaced servo sectors $30i$ are recorded on each track 4 of each disk 2. Data sectors 5 are recorded in the intervals between the servo sectors on each track. Servo sectors $30i$ may be sampled at regular intervals by a servo controller to provide servo position information to controller 8. Servo sectors $30i$ may be received by a read/write channel and may be processed by the servo controller to provide position information to controller 8. It should be appreciated that this is a simplified description of a hard disk drive and that many different types of disk drives may be implemented in accordance with embodiments of the invention.

Controller 8 may be implemented in a printed circuit board assembly (PCBA). Controller 8 may be coupled through SATA connector 11 through a link to host device 14.

It should be appreciated that a hard disk drive is only one example of a data storage device 1 that may be utilized. It should be appreciated that the data storage device 1 may be any type of data storage device having a controller such as another type of disk drive, a flash drive, a solid state drive, a semiconductor device, an optical memory, a CD device, a DVD device, or any suitable sort of data storage device.

Figure 2:
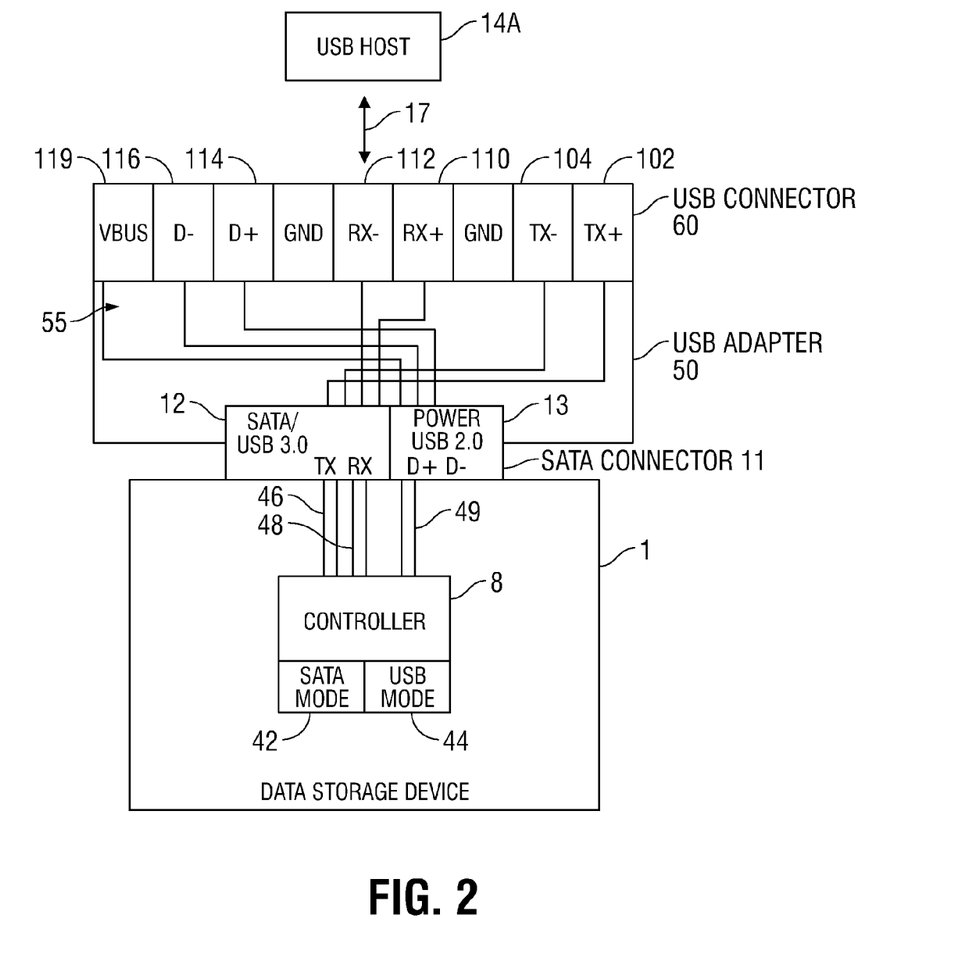
FIG. 2 shows a simplified block diagram of a data storage device having a SATA connector that is configured to communicate with a host in a USB mode, according to one embodiment of the invention.
Figure 5:
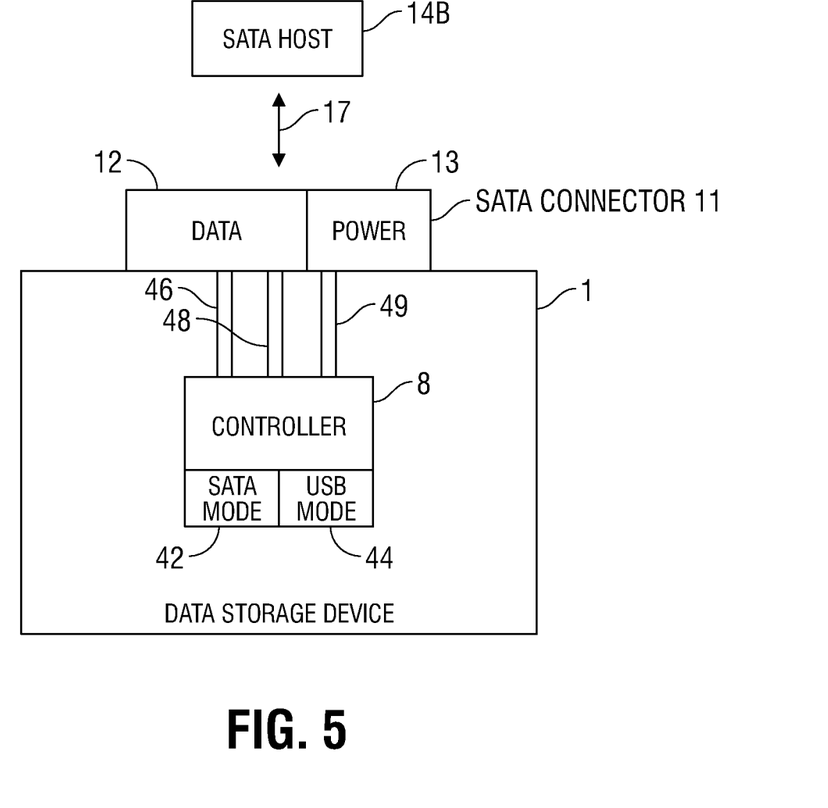
FIG. 5 shows a simplified block diagram of a data storage device having a SATA connector that is configured to communicate with a host in a SATA mode, according to one embodiment of the invention.

With reference to FIG. 2, FIG. 2 shows a data storage device 1 having a SATA connector 11 that is configured to communicate with a host 14A in USB mode or a host 14B in a SATA mode (e.g., see FIG. 5). In particular, controller 8 may select a SATA mode 42 or a USB mode 44 implementation. If the USB mode 44 has been selected by controller 8 for communication with host 14A, then a plurality of pins of the SATA connector 11 may be utilized to transmit and receive USB signals to and from the host 14A, respectively, via a USB adaptor 50 and a USB connector 60, as will be described in more detail later. If the SATA mode 42 has been selected by controller 8 for communication with host 14B, then a plurality of pins of the SATA connector 11 may be utilized to transmit and receive SATA signals to and from the host 14B, respectively, utilizing the SATA connector without the USB adaptor and the USB connector, as will be described in more detail later (e.g., see FIG. 5). As shown in FIG. 2, host 14A is a USB-based host so USB mode 44 is used.

In one embodiment, controller 8 of data storage device 1, through firmware, software, hardware, or other implementations, is designed to communicate data signals and control signals and to interface with a host utilizing either the SATA mode 42 or the USB mode 44. For example, in one embodiment, a configuration bit could be set to select either the SATA mode or the USB mode. Thus, controller 8 may be programmed to communicate with a host in either a SATA mode 42 or a USB mode 44 such that only one controller 8 and only one printed circuit board assembly (PCBA) are required for hosts that utilize either the SATA or the USB mode. This improves efficiency in the production of data storage devices by providing commonality in the production process such that only one controller 8 and one PCBA are required for either a USB interfaced host or a SATA interfaced host. As an example, a single data storage device 1 may be manufactured, and then depending upon the intended host (USB or SATA), the USB mode 44 or the SATA mode 42 may be selected. In the case of a SATA mode 42 selection, only the SATA connector 11 (which may be physically coupled with the storage device) is utilized (e.g., see FIG. 5, as will be described in more detail later), and if the USB mode 44 is selected, the USB adaptor 50 and USB connector 60 are utilized with the SATA connector 11 for USB implementation (as shown in FIG. 2). In other embodiments, the configuration may be reversed with the storage device coupled with a USB connector and a SATA adapter is provided for connection to a SATA host.

In the USB embodiment, a USB adapter 50 may be connected to the SATA connector 11 to connect the pins of the SATA connector 11 to the USB connector 60, which is then connected to USB host 14A via link 17. For example, link 17 may be a wired or wireless link with corresponding USB connectors. In the USB mode 44, controller 8 may be configured to transmit USB signals and to receive USB signals through trace lines 46 and 48 of the data storage device 1 through SATA pins of the SATA connector 11. These USB signals may be transmitted to and received from USB host 14A via link 17 through USB adaptor 50 and USB connector 60, as will be described in more detail.

In one embodiment, in order to accomplish these features, utilizing USB 3.0 mode as an example, signals may be transmitted from controller 8 along trace lines 46 to transmit pins TX of the data pins 12 of SATA connector 11 to USB host 14A and controller 8 may receive signals from USB host 14A through receive data pins RX of data pins 12 of the SATA connector 11 along trace lines 48. Additionally, in both the USB 3.0 and USB 2.0 modes, the USB Vbus signal may be received by controller 8 from USB host 14A on a power pin of the power pins 13 of the SATA connector along trace line 49.

If the USB mode 44 is selected and the USB host 14A is a USB 2.0 host, controller 8 may be configured to transmit USB 2.0 signals along trace line 49 to a D+ power pin of the power pins 13 and to receive USB 2.0 signals through a D− power pin of the power pins 13 of the SATA connector 11 through trace lines 49.

USB adapter 50 may be attached to SATA connector 11 to connect the pins of the SATA connector to the pins of the USB connector 60. USB adapter 50 may include a plurality of trace lines 55 that connect the pins from the SATA connector 11 to the pins of the USB connector 60 for communication with the USB host 14A. Although, as an example, USB adapter 50 has been illustrated using trace lines 55, it should be appreciated that any type of USB adapter 50 may be utilized to implement the connection between the pins of the SATA connector 11 and the pins of the USB connector 60. Examples of these types of adapters may include a printed circuit board (PCB), a flexible circuit, a wiring harness, cables, etc.

Figure 3:
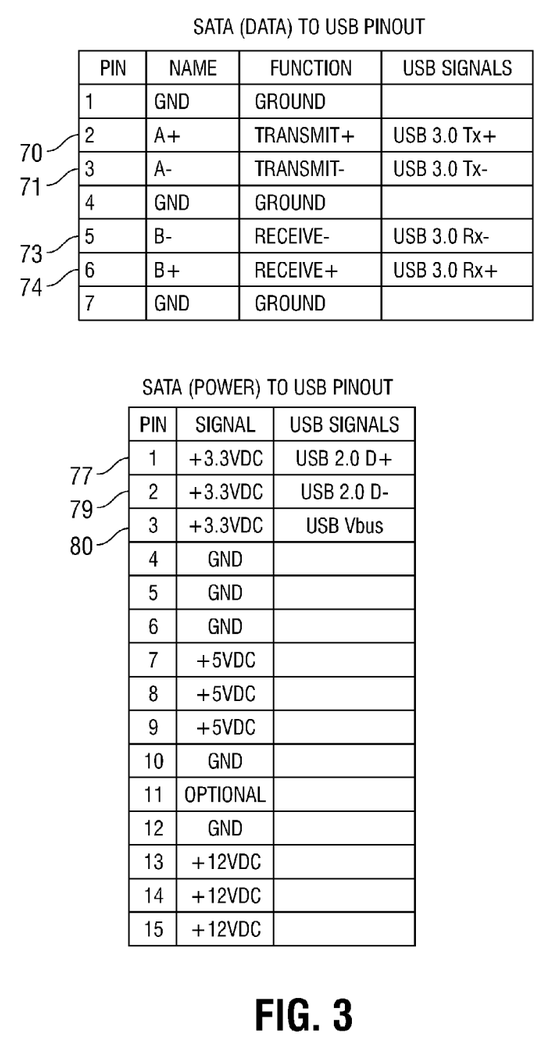
FIG. 3 is a table illustrating a SATA to USB pinout, according to one embodiment of the invention.
Figure 4:
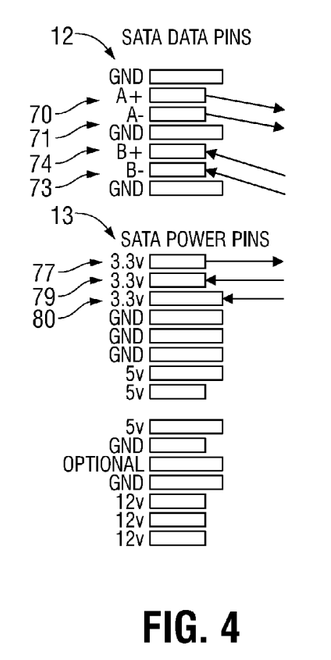
FIG. 4 is a diagram showing SATA pins of a SATA connector that may be utilized for USB signals, according to one embodiment of the invention.

With additional reference to FIGS. 3 and 4, examples of a SATA to USB pinout will be described. For example, when USB mode 44 is selected by controller 8 and the USB host 14A is configured for USB 3.0, transmit USB 3.0 signals are transmitted from controller 8 through trace lines 46 through SATA data pins 2 and 3 (70 and 71: TX+ and TX−) of the SATA data pins 12 of the SATA connector 11, then through appropriate trace lines 55 of USB adapter 50 to corresponding TX+ and TX− pins 102 and 104 of USB connector 60, and finally through link 17 to USB host 14A. As to receiving USB 3.0 signals from USB host 14A, USB signals are transmitted from USB host 14A through link 17 to receiving pins RX+ and RX− 110 and 112 of USB connector 60, which are transmitted through corresponding trace lines 55 of USB adapter 50 to SATA data pins 6 and 5 (74 and 73: RX+ and RX−) of the SATA data pins 12 of SATA connector 11 and are transmitted through trace lines 48 back to controller 8 of storage device 1 operating in the USB mode. It should be noted that TX+, TX−, RX+, RX− signals are in accordance with a version of the USB protocol (e.g., USB 3.0) in which signals are transmitted in differential pairs to address noise issues. Additionally, those skilled in the art will appreciate that FIGS. 3 and 4 provide examples only and that other pin mapping configurations are possible. For example, if the SATA pin assignments are changed pursuant to new specification versions, A+/A− and/or B+/B− pins may be located at different numbered pin locations and could still be mapped to the appropriate USB pins in accordance with the disclosure provided herein.

If USB mode 44 is selected by controller 8 and the USB host 14A is configured for USB 2.0, then USB 2.0 transmit signals are transmitted from controller 8 through trace lines 49 to SATA power pin 1 (77: D+) of the power pins 13 of the SATA connector 11 through trace lines 55 of USB adapter 50 and to pin D+114 of USB connector 60 and to USB host 14A via link 17. As to receiving signals from USB host 14A, USB 2.0 signals are transmitted from USB host 14A through link 17 to receiving pin D− 116 of USB connector 60, which are transmitted through corresponding trace lines 55 of USB adapter 50 to SATA power pin 2 (79: D−) of the SATA power pins 13 of SATA connector 11 and are transmitted through trace lines 49 back to controller 8 of storage device 1 operating in the USB mode. Additionally, in the USB 3.0 and USB 2.0 mode, the USB Vbus signal may be transmitted from USB host 14A via link 17 to Vbus pin 119 of USB connector 60 through a trace line 55 of USB adapter 50 to power pin 3 (80: Vbus) of the power pins 13 of the SATA connector 11 and through trace lines 49 to be received by controller 8 of data storage device 1. In other embodiments, different SATA power pins may be used to transmit the D+, D−, and/or the Vbus signals.

Alternatively, with reference to FIG. 5, if SATA mode 42 is selected by controller 8, controller 8 is configured to transmit SATA signals and to receive SATA signals on the SATA pins of the SATA connector 11 in accordance with one or more SATA specifications. In particular, when the SATA mode 42 is selected by controller 8, SATA signals are transmitted from controller 8 via trace lines 46 through data pins of the data section 12 of SATA connector 11 to SATA host 14B via link 17 and data signals are transmitted from SATA host 14B via link 17 to data pins 12 of SATA connector 11 through trace lines 48 back to controller 8 of data storage device 1 for processing. Further, power signals may be transmitted from controller 8 through trace lines 49 to power pins 13 of SATA connector 11 for conventional SATA operation. Thus, current SATA implementations are maintained when the SATA mode 42 is chosen by controller 8.

As previously described, when controller 8 is set to USB mode 44, by utilizing SATA connector 11 coupled with USB adapter 50 and USB connector 60, data storage device 1 can operate with a USB host 14A. Alternatively, the SATA mode 42 may be selected by data storage device 1 and the controller 8 is set to operate in the SATA mode 42 with the SATA connector 11. In this way, data storage devices may be manufactured, processed for SATA implementation with a SATA connector and may be re-purposed for use with a USB host by simply selecting the USB mode and by utilizing the USB adapter and the USB connector. By utilizing a SATA connector for both SATA and USB implementations and by selecting either SATA or USB mode by the controller (e.g., at the end of development/manufacturing), this allows one printed circuit board assembly (PCBA) with a controller to be utilized with both USB hosts and SATA hosts.

It should be appreciated that some embodiments of the invention may be implemented in the controller of a data storage device and may operate under the control of a program, software, firmware, or routine to execute methods or processes in accordance with the previously described embodiments of the invention. For purposes of the present specification, it should be appreciated that the terms "controller", "processor", etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a subprogram, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes described previously can be employed by a data storage device, as previously described. However, other types of data storage devices with similar or other media format characteristics can be employed by those skilled in the art to use the invention with equal advantage to implement these techniques.

What is claimed is:

1. A data storage device configured to communicate with an external host system, the data storage device comprising:
   a controller;
   a first SATA connector coupled to the controller and comprising:
      first and second SATA transmit data pins and first and second SATA receive data pins; and
      first, second and third SATA power pins; and
   a USB adapter comprising a second SATA connector physically mated to the first SATA connector and a USB connector comprising:
      a USB power pin;
      first and second USB 2.0 data pins;
      first and second USB 3.0 transmit data pins; and
      first and second USB 3.0 receive data pins;
   wherein the USB adapter further comprises a plurality of traces that electrically connect:
      the first and second USB 2.0 data pins to the first and second SATA power pins, respectively;
      the first and second SATA transmit data pins to the first and second USB 3.0 transmit data pins, respectively;
      the first and second SATA receive data pins to the first and second USB 3.0 receive data pins, respectively; and
      the third SATA power pin to the USB power pin;
   wherein, in a USB 2.0 mode, the controller is configured to transmit data signals to a host USB connector over the first and second SATA power pins and the first and second USB 2.0 data pins; and
   wherein, in a USB 3.0 mode, the controller is further configured to transmit data signals to the host USB connector over the first and second SATA transmit data pins and the first and second USB 3.0 transmit data pins.

2. The data storage device of claim 1, wherein, in the USB 3.0 mode, the controller is further configured to receive USB signals from the host USB connector over the first and second SATA receive data pins and the first and second USB 3.0 receive data pins.

3. The data storage device of claim 2, wherein, in the USB 2.0 and 3.0 modes, the controller is further configured to receive a USB Vbus signal over the third SATA power pin.

4. The data storage device of claim 1, wherein the USB connector is a USB 3.0 connector.

5. The data storage device of claim 1, wherein, in a SATA mode, the controller is further configured to receive SATA signals over the first and second SATA receive data pins.

6. The data storage device of claim 1, wherein the data storage device comprises a hard disk drive.

7. The data storage device of claim 1, wherein the data storage device comprises a solid state drive.

8. A method for a data storage device to communicate with a host, the method comprising:
   identifying a SATA mode, a USB 2.0 mode or a USB 3.0 mode for communicating with a host;
   connecting first and second USB 2.0 data pins of a USB connector to first and second SATA power pins, respectively, of a SATA connector;
   connecting first and second USB 3.0 transmit data pins of the USB connector to first and second SATA transmit data pins, respectively, of the SATA connector;
   connecting first and second USB 3.0 receive data pins of the USB connector to first and second SATA receive data pins, respectively, of the SATA connector;
   in the USB 2.0 mode, transmitting data signals from the data storage device to the host over the first and second SATA power pins and the first and second USB 2.0 data pins; and
   in the USB 3.0 mode, transmitting data signals from the data storage device to the host over the first and second SATA transmit data pins and the first and second USB 3.0 transmit data pins.

9. The method of claim 8, further comprising, in the USB 3.0 mode, receiving USB signals from the host over the first and second SATA receive and first and second USB 3.0 receive data pins data pins.

10. The method of claim 9, further comprising, in the USB 3.0 mode, receiving a USB Vbus signal over a third SATA power pin of the SATA connector.

11. The method of claim 8, wherein the USB connector is a USB 3.0 connector.

12. The method of claim 8, further comprising, in the SATA mode, receiving SATA signals from the host over the first and second SATA receive data pins.

13. The method of claim 8, wherein the data storage device comprises a hard disk drive.

14. The method of claim 8, wherein the data storage device comprises a solid state drive.

* * * * *